United States Patent
Bibbo (10) Patent No.: US 9,869,408 B2
(45) Date of Patent: *Jan. 16, 2018

(54) SINGLE-USE WALL PASS-THROUGH SYSTEM

(71) Applicant: NewAge Industries, Inc., Southampton, PA (US)

(72) Inventor: Kenneth Bibbo, Freehold, NJ (US)

(73) Assignee: NewAge Industries, Inc., Southampton, PA (US)

( * ) Notice: Subject to any disclaimer, the term of this patent is extended or adjusted under 35 U.S.C. 154(b) by 602 days.

This patent is subject to a terminal disclaimer.

(21) Appl. No.: 14/501,506

(22) Filed: Sep. 30, 2014

(65) Prior Publication Data

US 2015/0054230 A1 Feb. 26, 2015

Related U.S. Application Data

(63) Continuation-in-part of application No. 13/853,392, filed on Mar. 29, 2013, now Pat. No. 8,870,230.

(60) Provisional application No. 61/617,941, filed on Mar. 30, 2012.

(51) Int. Cl.
*F16L 5/02* (2006.01)
*E04C 2/52* (2006.01)

(52) U.S. Cl.
CPC ............... *F16L 5/02* (2013.01); *E04C 2/521* (2013.01)

(58) Field of Classification Search
CPC ............. F16L 5/00; F16L 5/02; F16L 23/06
USPC .......... 285/139.1, 136.1, 409, 408, 407, 365
See application file for complete search history.

(56) References Cited

U.S. PATENT DOCUMENTS

| | | | |
|---|---|---|---|
| 1,062,015 A | 5/1913 | Lane | |
| 1,989,614 A | 1/1935 | Halpern et al. | |
| 2,198,535 A | 4/1940 | James | |
| 2,413,308 A | 12/1946 | Arnold | |
| 2,793,830 A | 5/1957 | Nakaji et al. | |
| 2,882,071 A * | 4/1959 | Klompar | B64D 37/12 285/409 |
| 3,275,347 A | 9/1966 | Scott | |
| 3,351,361 A | 11/1967 | Martin | |
| 3,649,054 A | 3/1972 | McClenan | |
| 4,071,265 A | 1/1978 | Wallace | |
| 4,071,267 A * | 1/1978 | Davis | F16L 3/00 285/136.1 |
| 4,194,765 A | 3/1980 | Reddy | |
| 4,252,348 A | 2/1981 | Kojima | |
| 4,281,422 A | 8/1981 | Simonelli | |

(Continued)

FOREIGN PATENT DOCUMENTS

EP 0117821 9/1984

*Primary Examiner* — David E Bochna
(74) *Attorney, Agent, or Firm* — Volpe and Koenig, P.C.

(57) ABSTRACT

A single use wall pass-through system having a fixed wall part attached through an opening in a wall and connected by at least one mounting flange. The fixed wall part includes clamping flanges used to provide a sealed connection between the fixed wall part and the hose or tube which carries the material from an outside area into another area defined on the inside of the wall. A gasket is used along with a clamp plate for connection to the clamping flange via a clamping ring. The clamp plate can be two pieces separated by a dividing line and the clamp plate hose opening intersects the dividing line. The transfer hose and the gasket are disposable. The clamp ring and clamp plate can be re-used.

18 Claims, 11 Drawing Sheets

(56) References Cited

U.S. PATENT DOCUMENTS

| | | | |
|---|---|---|---|
| 4,429,655 A * | 2/1984 | Tang | B63B 22/021 |
| | | | 285/136.1 |
| 4,593,940 A | 6/1986 | Wilder | |
| 4,828,296 A | 5/1989 | Medvick | |
| 5,290,071 A | 3/1994 | Rider et al. | |
| 5,345,813 A | 9/1994 | Flessas | |
| 5,505,499 A | 4/1996 | Wallbank | |
| 5,562,882 A | 10/1996 | Smith et al. | |
| 5,722,699 A | 3/1998 | Brancher | |
| 5,803,513 A | 9/1998 | Richardson | |
| 5,921,589 A | 7/1999 | Dubois | |
| 5,967,567 A | 10/1999 | Nordstrom | |
| 5,971,444 A | 10/1999 | Hawkins | |
| 6,161,589 A * | 12/2000 | Bolotte | F16L 5/02 |
| | | | 138/106 |
| 6,183,021 B1 | 2/2001 | Walsh et al. | |
| 6,883,836 B2 | 4/2005 | Breay et al. | |
| 7,237,806 B2 * | 7/2007 | Krowech | F16L 5/10 |
| | | | 285/136.1 |
| 7,284,731 B1 * | 10/2007 | Johnson | F16L 23/04 |
| | | | 285/407 |
| 7,712,789 B2 | 5/2010 | Heuer et al. | |
| 7,758,084 B2 | 7/2010 | Boudry et al. | |
| 8,328,245 B2 * | 12/2012 | Gayer | B01J 3/002 |
| | | | 285/407 |
| 2004/0094951 A1 | 5/2004 | Sigrist et al. | |
| 2006/0001261 A1 * | 1/2006 | Miyajima | F16L 5/10 |
| | | | 285/136.1 |
| 2008/0084032 A1 * | 4/2008 | Cravens | F16L 5/02 |
| | | | 277/609 |
| 2015/0014943 A1 * | 1/2015 | Vasinis | F16L 5/00 |
| | | | 277/606 |
| 2016/0164270 A1 * | 6/2016 | Sims | F16L 5/00 |
| | | | 174/50 |

* cited by examiner

SINGLE-USE WALL PASS-THROUGH SYSTEM

INCORPORATION BY REFERENCE

The following documents are incorporated herein by reference as if fully set forth: U.S. patent application Ser. No. 13/853,392, filed Mar. 29, 2013; and U.S. Provisional Application No. 61/617,941, filed Mar. 30, 2012.

BACKGROUND

In chemical, bio, and pharma processing, it is often necessary to deliver a liquid product or agent from a transport or "dirty" processing area to a "clean" area in which processing of the materials takes place. This often involves the use of a wall pass-through in which a tube or hose carrying a liquid chemical, bio, or pharma product must pass through a wall into the clean room and then the tube or hose sealed against the wall opening so that no potentially hazardous material escapes from the clean room through the wall opening once processing begins. This can also be used to keep contaminants from entering the clean room. Further, this can also be used to maintain the integrity and HVAC balance of either room and prevent migration of particulates from one room to another.

The prior known systems involve a series of tubes, fitments, clamps and gaskets which must typically be cleaned after use. It would be desirable to provide a simple, disposable system for transferring products from an outside area into a clean processing room through a wall pass-through which eliminates the need for cleaning at least the components in contact with the materials, while still providing a secure and sealed connection between a clean room separated by a wall from an outside environment and the outside environment.

SUMMARY

A single use wall pass-through system is provided, comprising a tube assembly that is attachable through an opening in a wall, including a tubular body with at least one support flange. A first mounting flange is connected to the support flange around an inner periphery of the first mounting flange and adapted to be connected to the wall around an outer periphery thereof that overlaps the opening. The tube assembly includes a clamping flange connected to each end of the tubular body. A hose or tube is arranged through the tubular body and passes through a hose opening in a gasket. A clamp ring clamps the gasket between one of the clamping flanges and a clamp plate, the clamp plate being provided as two clamp plate pieces that are aligned together about a dividing line to form the clamp plate, and a clamp plate hose opening for the hose or tube intersects the dividing line. The tube or hose and the gasket are single use.

In one arrangement, the clamp ring includes two half-rings that are connectable to one another, and the clamp plate pieces are fixed to respective ones of the half-rings.

In another preferred arrangement, there are first and second ones of the support flanges on the tubular body, and a second mounting flange connects the second support flange to an opposite side of the wall from the first mounting flange. Preferably, the mounting flanges includes a wall mounting surface and a support flange mounting surface, and the wall mounting surface is axially offset from the support flange mounting surface. Here, the axial offset is determined by a wall thickness and a distance between the first and second support flanges, and different mounting flanges having a range of axial offsets can be provided to accommodate walls of different thicknesses.

Preferably, the wall mounting flange surfaces are sealed to the wall and the support flange mounting surfaces are sealed to the support flanges.

In another aspect, a plurality of the clamp plate hose openings are provided in the clamp plate, and each of the clamp plate hose openings intersects the dividing line.

In one arrangement, the clamp plate hose opening is larger than an outside diameter of the hose or tube. Alternatively, the clamp plate hose opening includes a tube engaging profile on an inner surface thereof. Here, the hose or tube preferably fits in the clamp plate hose opening with an interference fit. The tube engaging profile can be a convex surface. It can also be a beveled surface or other shape that provides a more concentrated contact force for engaging the hose or tube.

Preferably, the hose or tube is made of silicone or a thermoplastic material the gasket is made from silicone or a thermoplastic material, and is connected to the hose using silicone or an adhesive of chemical bond In one arrangement, a plurality of the hose openings are located in the gasket, and a corresponding plurality of the hoses or tubes are provided, with one of the hoses or tubes extending through each of the openings.

In another aspect, a method of connecting a hose through a single-use wall pass-through system is provided, and includes the steps of:

removing a clamp plate installed on a clean side of a wall pass-through chamber defined by tubular body connected to clamping flanges that are attached on either side of a wall through an opening between the clean side and a dirty side, with the body being connected to the wall in a sealed manner;

installing the tube through a hole or opening in a gasket on the clean side, such that the tube is connected to the clean side gasket in a sealed manner gasket;

placing an end of the tube which is closed off into an inside of the wall pass-through chamber;

re-installing the clean side clamp plate over the gasket on the tube on the clean side so that the end of the tube is sealed in the chamber;

pressurizing the chamber with process air from a process air source;

removing a clamp plate from the dirty side;

pulling the tube into the dirty side;

installing the tube through a hole or opening in a gasket on the dirty side such that the tube is connected to the dirty side gasket in a sealed manner gasket;

re-installing the dirty side clamp plate over the gasket on the tube on the dirty side so that the end of the tube extends out through the dirty side gasket.

In another aspect, the clean side clamp plate is provided as two clamp plate pieces that are aligned together about a dividing line to form the clamp plate, and a clamp plate hose opening for the hose or tube intersects the dividing line. The two clamp plate pieces are placed around the hose or tube during the re-installing of the clean side clamp plate.

In one embodiment, the clamp plate hose opening includes a tube engaging profile on an inner surface thereof that clamps against the hose or tube.

In another aspect, the dirty side clamp plate is provided as two clamp plate pieces that are aligned together about a dividing line to form the clamp plate, and a clamp plate hose opening for the hose or tube intersects the dividing line. The two clamp plate pieces are placed around the hose or tube during the re-installing of the dirty side clamp plate.

BRIEF DESCRIPTION OF THE DRAWING(S)

The foregoing summary as well as the following detailed description will be better understood when reviewed in conjunction with the appended drawings.

In the drawings.

DETAILED DESCRIPTION OF THE PREFERRED EMBODIMENT

Certain terminology is used in the following description for convenience only and is not considered limiting. Words such as "top", "bottom", "left", and "right" indicate directions in the drawings to which reference is made, and are not considered limiting. This terminology includes the words specifically noted above and derivatives thereof and words of similar import. Additionally, the terms "a" and "one" are defined as including one or more of the referenced item unless specifically noted.

Figure 1:
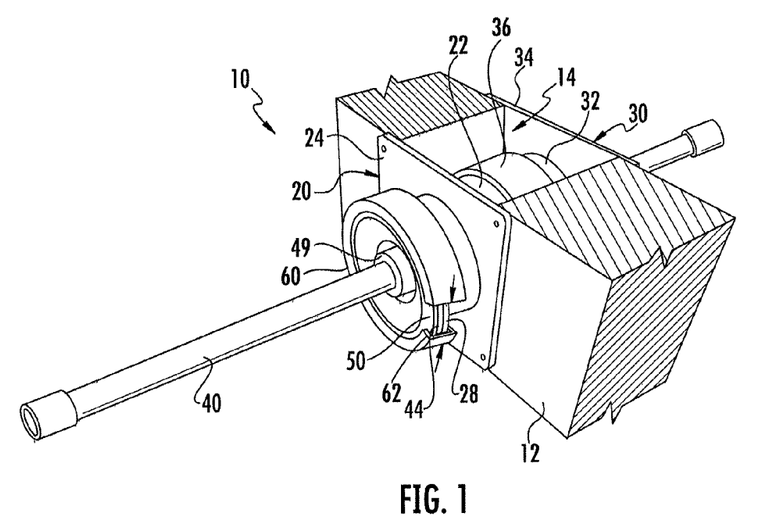
FIG. 1 is a perspective view of a single use wall pass-through system according to the invention.

Referring to FIG. 1, a single use wall pass-through system 10 is shown. The pass-through system 10 is mounted through a wall 12, shown partially broken away, through an opening 14 defined in the wall 12.

Figure 2:
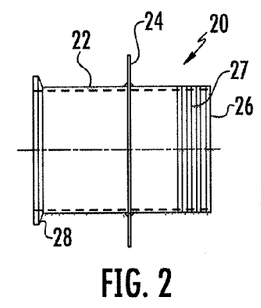
FIG. 2 is a side view of a first fixed wall part used in the single use wall pass-through system shown in FIG. 1.

Referring to FIGS. 1-4, the pass-through system 10 includes a first fixed wall part 20 having a tubular body 22 with a mounting flange 24 located thereon. A coupling interface 26 is located at a portion of the tubular body 22 that is adapted to be inserted into the opening 14 in the wall 12. As shown in FIG. 2, the coupling interface 26 on the first fixed wall part 20 can utilize external threads 27. Alternatively, the tubular body 22 does not require threads, and an alternate arrangement can be provided. A clamping flange 28 is located on the side of the first fixed wall part 20 that extends out from the wall 12. Preferably, the first fixed wall part 20 is made of stainless steel and is a welded assembly. Alternatively, it can be made from other materials, such as other types of metal or polymeric materials.

Figure 3:
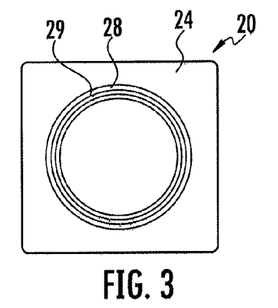
FIG. 3 is an end view of the first fixed wall part shown in FIG. 2.

As shown in FIG. 3, preferably the clamping flange 28 includes a beveled edge on one side. A gasket groove 29 can be provided on the other side which is adapted to receive a bead located on the gasket, which is discussed in detail further below.

Figure 4:
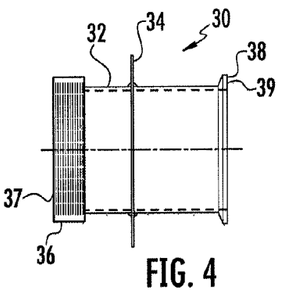
FIG. 4 is a side view of a second fixed wall part used in the single use wall pass-through system shown in FIG. 1.

Referring to FIG. 4, the second fixed wall part 30 is shown in detail. The second fixed wall part 30 is similar to the first fixed wall part 20, and includes a tubular body 32 along with a mounting flange 34 for connection to the wall 12 around the opening 14. A coupling interface 36 is located on the tubular body 32 and preferably is in the form of a sleeve 37 having internal threads which are complementary to the external threads 27 on the first fixed wall part 20. Alternatively, no threads are required. A clamping flange 38 is located on the part of the second fixed wall part 30 that extends out from the wall 12. Preferably, the clamping flange 38 also includes a gasket groove 39 for receiving a bead on the gasket.

As shown in FIG. 1, the first and second fixed wall parts 20, 30 can be mounted to the wall 12 by inserting them into the opening 14 from opposite sides of the wall 12 and connecting them together via the coupling interface 26, 36 on the first and second fixed wall parts 20, 30 within the wall 12. In the embodiment shown using a threaded connection, the distance between the mounting flanges 24, 34 can be adjusted depending upon the depth of engagement of the threads 27 on the first fixed wall part in the sleeve 37 on the second fixed wall part 30. Alternatively, if no threads are provided on either the fixed wall parts 20, 30, the sleeve 37 would be unthreaded and would provide a slip fit between the first and second wall parts which can be sealed using an adhesive or sealant or with o-rings located around the circumference of the interface.

Figure 5:
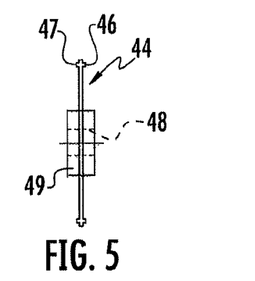
FIG. 5 is a side view of a gasket for the single-use wall pass-through system.
Figure 6:
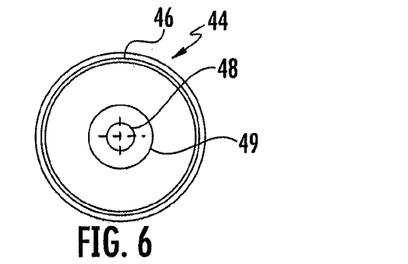
FIG. 6 is an end view of the gasket shown in FIG. 5.

Referring to FIGS. 5 and 6, a first embodiment of a gasket 44 is shown. Here the gasket 44 includes clamping beads 46, 47 that extend around the periphery on each side of the gasket 44. A center opening 48 is defined through the gasket 44 and is surrounded by a reinforcement 49. As shown in FIG. 1, the gasket 44 is preferably located on a hose or tube 40 that is extending through the wall pass-through. The hose or tube 40 is preferably made of silicone or a thermoplastic material and is a single use hose or tube for transferring material from one side of the wall 12, such as an outside corridor, to the other side of the wall 12, which can be a clean room or processing area. The gasket 44 is preferably made from silicone or a thermoplastic material, and is connected to the hose using silicone or an adhesive of chemical bond.

Figure 7:
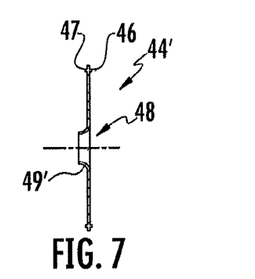
FIG. 7 is a side view of an alternate embodiment of a gasket for use in connection with the single use wall pass-through system shown in FIG. 1.
Figure 8:
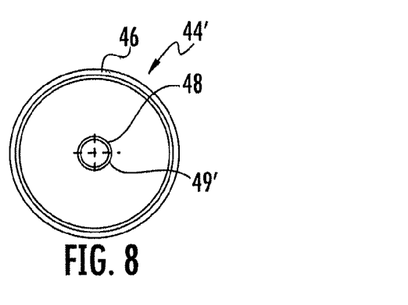
FIG. 8 is an end view of the gasket shown in FIG. 7.

Referring to FIGS. 7 and 8, a second embodiment of the gasket 44' is shown. Here the gasket 44' is the same as the gasket 44 except that the reinforcement 49' only extends in one direction from a surface of the gasket 44' and is not bonded or adhered to the hose or tube. This allows gasket 44' to move along the axis of the hose or tube and fit into the mating flange without stretching or compressing the hose or tube.

Figure 9:
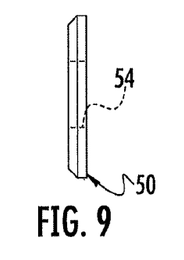
FIG. 9 is a side view of a clamp plate used in connection with the single use wall pass-through system shown in FIG. 1.
Figure 10:
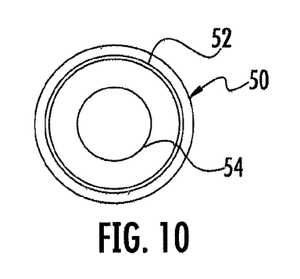
FIG. 10 is an end view of the clamp plate.

Referring to FIGS. 9 and 10, a clamp plate 50 is shown. The clamp plate 50 preferably has the same shape as the clamping flange 28, 38 on one or both of the fixed wall parts 20, 30. This includes a beveled edge around the periphery on one side, as well as a gasket groove 52 on the opposite side which is adapted to receive a clamping bead 46, 47 on one side of the gasket 44. A least one opening 54 is provided which is large enough to accommodate the reinforcement 49 on the gasket 44. The opening 54 can be circular or slotted to allow the insertion of the clamp plate 50, without having to thread the tube end 40, or the fitting 42 therethrough. More than one opening 54 could be provided, depending upon the gasket configuration and the number of hoses or tubes 40 that are to be passed through the wall pass-through.

Figure 12:
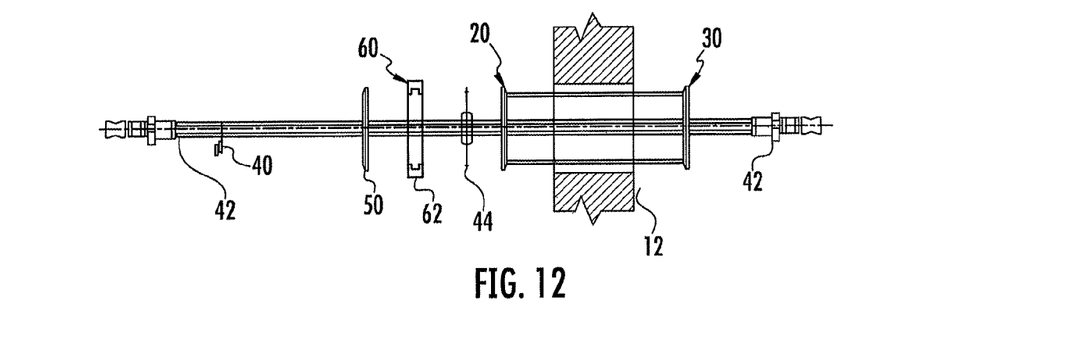
FIG. 12 is a schematic side view showing the installation of a hose or tube through the single use wall pass-through system.

Referring to FIG. 12, the installation of a hose or tube 40 through the wall pass-through system 10 is shown in detail. Here a gasket 44 has been bonded or adhered to the hose or tube 40 and the gasket 44 is aligned so that the clamping bead 46 on one side of the gasket is received at least partially within the gasket groove 29 on the clamping flange 28 of the first fixed wall part 20. The clamp plate 50, which has been placed over the hose or tube 40, is aligned with the clamping flange 28 with the gasket 44 located therebetween, and the clamping bead 47 on the opposite side of the gasket 44 being at least partially received within the gasket groove 52 of the clamping plate 50. A clamp ring 60, shown in FIGS. 1 and 12 is then placed around the clamping flange 28, the gasket 44 and the clamping plate 50 and tightened. The clamp ring 60 has a channel-shaped cross-section having inside bevels which are adapted to force the clamping plate 50 against the clamping flange 28 via contact with the bevels located on the opposite sides of the clamp plate 50 and the clamping flange 28. The clamp ring 60 is a standard sanitary flange clamp and can be tightened via a threaded coupling represented only schematically via arrows shown in FIG. 1 in order to tighten the clamp ring 60. The channel-shaped cross-section 62 of the clamp ring 60 is shown most clearly in FIG. 12 and the bevels on the back side of the clamping plate 50 and the clamping flange 28 are shown most clearly in FIGS. 9 and 2, respectively.

Once installed, material can then be transferred through the hose or tube 40 from outside of the wall 12 to an inside of the wall 12 without the risks of any materials, which could be contaminants or hazardous materials, escaping from one side of the wall 12 to the other side of the wall 12. After transfer of the material and any processing within the clean room or other area delimited via the wall 12 is completed, the tube 40 and gasket 44 can be removed and discarded.

Figure 11:
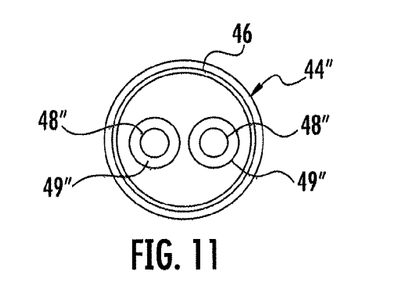
FIG. 11 was is an end view of an alternate embodiment of a gasket.

Referring to FIG. 11, an alternate configuration for the gasket 44" is shown. Here two openings 48" are shown having reinforcements 49". Alternate gasket arrangements can be provided allowing multiple tubes or hoses 40 to be passed through the opening 14 in the wall 12 when multiple materials are being used or required for processing.

Figure 13:
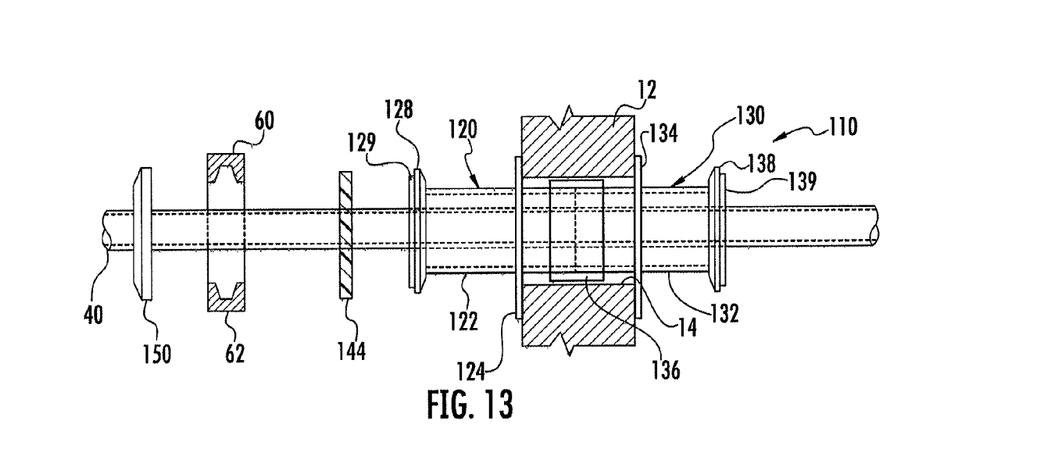
FIG. 13 is a schematic side view of an alternate embodiment of a single use wall pass-through system according to the invention.
Figure 14:
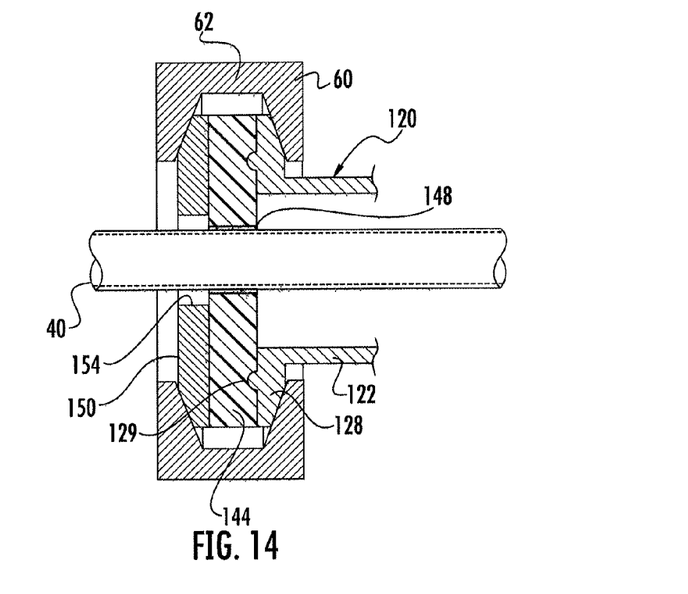
FIG. 14 is an enlarged cross-sectional view through the clamped gasket in the embodiment of FIG. 13.

Referring to FIGS. 13 and 14, another embodiment of the pass-through system 110 is shown and includes a first fixed wall part 120 having a tubular body 122 with a mounting flange 124 located thereon. A clamping flange 128 is located on the side of the first fixed wall part 120 that extends out from the wall 12. The clamping flange 128 includes an annular bead 129 extending outwardly therefrom for clamping into a flat gasket 144, described in detail below. Preferably, the first fixed wall part 120 is made of stainless steel and is a welded assembly. Alternatively, it can be made from other materials, such as other types of metal or polymeric materials.

As shown in FIG. 14, preferably the clamping flange 128 includes a beveled edge on one side similar to the flange 28 above to generate an axial force as the clamping band 60 is tightened.

Still with reference to FIG. 12, the second fixed wall part 130 is shown in detail. The second fixed wall part 130 is similar to the first fixed wall part 120, and includes a tubular body 132 along with a mounting flange 134 for connection to the wall 12 around the opening 14. A coupling 136 is located on the tubular body 132 for coupling to the first fixed wall part 120. A clamping flange 138 is located on the part of the second fixed wall part 30 that extends out from the wall 12. Preferably, the clamping flange 138 includes an annular bead 139 extending outwardly therefrom for clamping into a flat gasket 144, if desired, in a similar manner shown for the clamping flange 128.

The first and second fixed wall parts 120, 130 are mounted to the wall 12 by inserting them into the opening 14 from opposite sides of the wall 12 and connecting them together via the coupling 136, which can be a slip fit coupling, with an adhesive or sealant provided between the coupling 136 and the tubular bodies 122, 132.

Still with reference to FIGS. 13 and 14, in the embodiment 110, the gasket 144 is formed of flat sheet material. A center opening 148 is defined through the gasket 144. The flat sheet material is thick enough that no reinforcement is required, and the flat sheet material can be easily cut and/or punched to make form the desired gasket to allow one, two or more hoses or tubes 40 to be accommodated. The hose or tube 40 is preferably made of silicone or a thermoplastic material and is a single use hose or tube for transferring material from one side of the wall 12, such as an outside corridor, to the other side of the wall 12, which can be a clean room or processing area. The gasket 144 is preferably made from silicone or a thermoplastic flat sheet material, and is connected to the hose 40 using silicone or an adhesive of chemical bond.

During clamping, the annular bead 129 on the flange 128 is pressed into the flat gasket material and forms a tight seal upon clamping of the clamping plate 150 against the clamping flange 128 using the clamp 60. Optionally, a bead similar to the bead 129 can be provided on the clamping plate 150.

This arrangement 110 is economical for the production of the single use system components since no molding of the gasket 144 is required as it can be punched or cut from sheet material. Further, this embodiment can be used in connection with larger sized openings, for example, 12 inch diameter or larger tubular bodies 122, 132.

Figure 15:
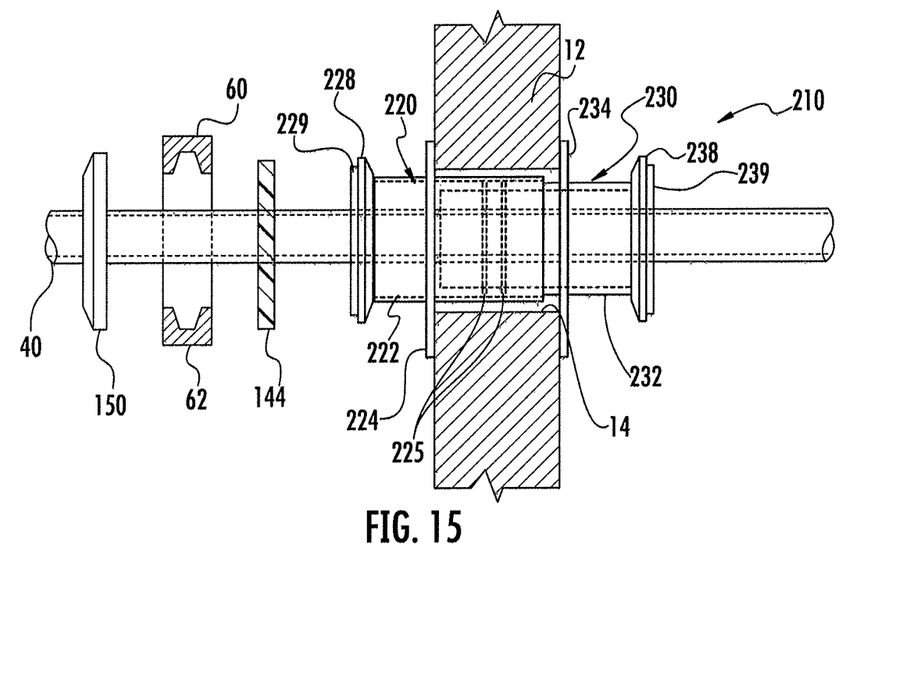
FIG. 15 is a schematic side view of a second alternate embodiment of a single use wall pass-through system according to the invention.

Referring to FIG. 15, another embodiment of the pass-through system 210 is shown and includes a first fixed wall part 220 having a tubular body 222 with a mounting flange 224 located thereon. A clamping flange 228 is located on the side of the first fixed wall part 220 that extends out from the wall 12. The clamping flange 228 includes an annular bead 229 extending outwardly therefrom for clamping into a flat gasket 144, as described above. Preferably, the first fixed wall part 220 is made of stainless steel and is a welded assembly. Alternatively, it can be made from other materials, such as other types of metal or polymeric materials. The clamping flange 228 includes a beveled edge on one side similar to the flange 28, 128 above to generate an axial force as the clamping band 60 is tightened.

Still with reference to FIG. 15, the second fixed wall part 230 is shown in detail. The second fixed wall part 230 is similar to the first fixed wall part 220, and includes a tubular body 232 along with a mounting flange 234 for connection to the wall 12 around the opening 14. The tubular body 232 has a smaller outside diameter than the inside diameter of the tubular body 222 to allow a slip fit therein. A clamping flange 238 is located on the part of the second fixed wall part 30 that extends out from the wall 12. Preferably, the clamping flange 238 includes an annular bead 239 extending outwardly therefrom for clamping into a flat gasket, if desired, in a similar manner shown for the clamping flange 228.

The tubular bodies 222, 232 are not threaded and sized so that one slips inside the other, and a pair of elastomeric o-rings 225 are located inside the tubular body 222 on its inner circumference, or in grooves specifically provided for the o-rings 225, and the 0-rings 225 are compressed by the outer circumference of the inner tubular body 232 as the tubular bodies 222, 232 are slid together, making an air-tight seal without the need for sealants or adhesives.

The gasket 144 with the center opening 148 can be used in the arrangement 210 in a similar manner to the arrangement 110 as discussed above. Installation and clamping are the same as discussed above in connection with the arrangement 110. Once the material transfer is complete, the single use hose or tube 40 and the gasket 144 are disposed of.

Figure 16:
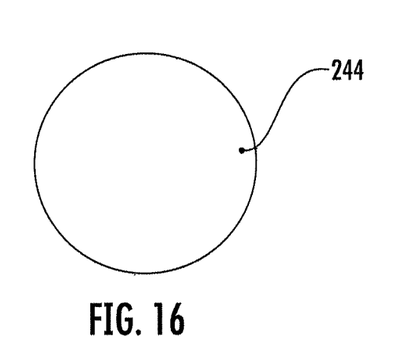
FIG. 16 is an end view of an alternate gasket made from sheet material for the wall pass-through systems of FIGS. 13 and 15.
Figure 17:
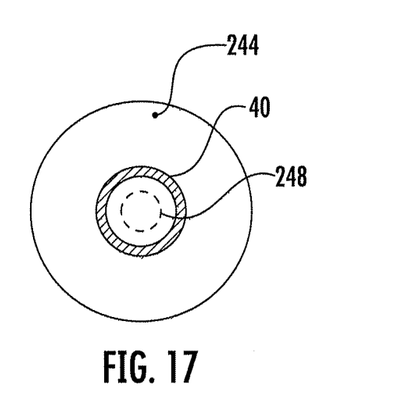
FIG. 17 is an end view of the gasket of FIG. 16, shown with a hose connected by an interference fit through an opening cut therein.

Referring to FIGS. 16 and 17, an alternate gasket 244 for use with the arrangements 110, 210 discussed above is provided. The gasket 244 is preferably made from silicone or a thermoplastic flat sheet material, and is connected to the hose 40 only by an interference fit. This provides a reduced cost since the gasket 244 can just be cut from sheet material, as shown in FIG. 16, and then an undersized hole 248 is cut, represented in dashed lines in FIG. 17, and the tube 40 is forced through the hole, providing an interference fit due to the resilient property of the sheet material. This eliminates the need for adhesives in order to connect to the tube 40.

The gasket 244 can also be used in the form shown in FIG. 16, without any hole 248 cut therein, in which case the arrangements 110, 201 could just be used as a sealed wall pass-through chamber by keeping a the uncut gasket 244 in place on one side as any materials to be passed into or out of the clean room are loaded, and then a cover formed by another gasket 244 is placed on the open, loading side prior to the other gasket 244 being removed from the unloading side. This allows additional functionality for these arrangements in an extremely cost effective manner.

Figure 18:
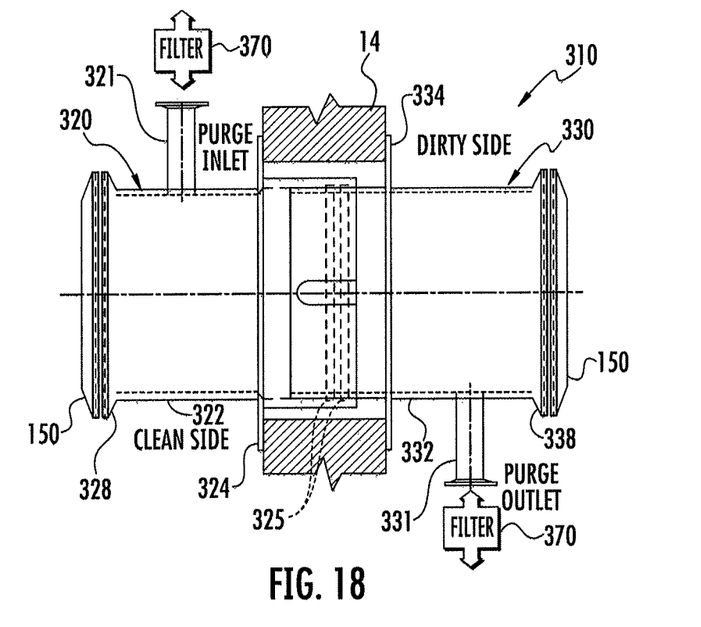
FIGS. 18-25 are a series of views of the single use wall pass-through system illustrating a method of use in order to prevent contamination in which the first and second fixed wall parts each include an additional side port for connecting a clean process air flow.

Referring now to FIGS. 18-25, a method for use of the single use wall pass-through system is shown with a further embodiment of the system 310, which includes an optional purge connection. As shown in FIG. 18, the system 310 is similar to the system 210 discussed above, and includes the first fixed wall part 320 and the second fixed wall part 330 with the tubular bodies 322, 332 and wall flanges 324, 334 for attachment on both sides of an opening in a wall 14. O-rings 325, which are similar to the O-rings 225 above, are used to seal the first and second fixed wall parts 320, 330 together. Here, an inlet purge tube 321 is connected to the first tubular body 322 and an outlet purge tube 331 is connected to the second tubular body 332. The inlet and outlet purge tubes 321, 331 allow process air to be carried into and from the enclosed area to allow connections to be made without contamination traveling from the "Clean Side" to the "Dirty Side" of a clean room wall. The inlet and outlet purge tubes preferably have air filters 370 connected at the openings on in-line with the process air connections. Clamping flanges 328, 338 are located at the respective ends for attachment of clamp plates 150 and associated gaskets 44, 144, 244. The clamps 60 are not shown for clarity.

Figure 19:
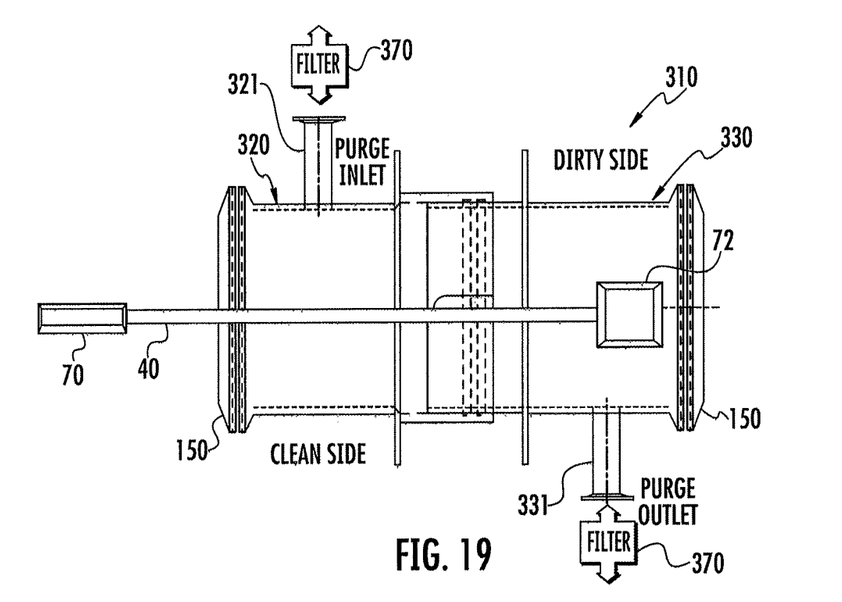

A process for installing a tube 40 through the single use wall pass-through system 310 starts with the system 310 in the closed-off state as shown in FIG. 18. Here, the clamp plates 150 are solid plates preferably installed with a non-perforated gasket 144, as discussed above, or can be clamp plates 150 with openings that are installed with a non-perforated gasket 244. Purge inlet and outlet air filters 370 are installed. These filters 370 are preferably 1 micron filters. The clean side end cap 150 and gasket 244 are removed and the interior of the system, defined by the tubular bodies 322, 332, is wiped down with a cleaner and/or disinfectant, such as alcohol. Referring to FIG. 19, the tube 40 is installed through a hole cut in the gasket 244 with an interference fit, or one of the other gaskets 44, 144 above, and the end of the tube 40, which is closed off with a cap 72, is placed into the inside of the pass-through system 310. The clamp plate 150 is re-installed and clamped in place on the Clean Side. Preferably, the tube 40 is also closed off with a cap 70 on the Clean Side.

Figure 20:
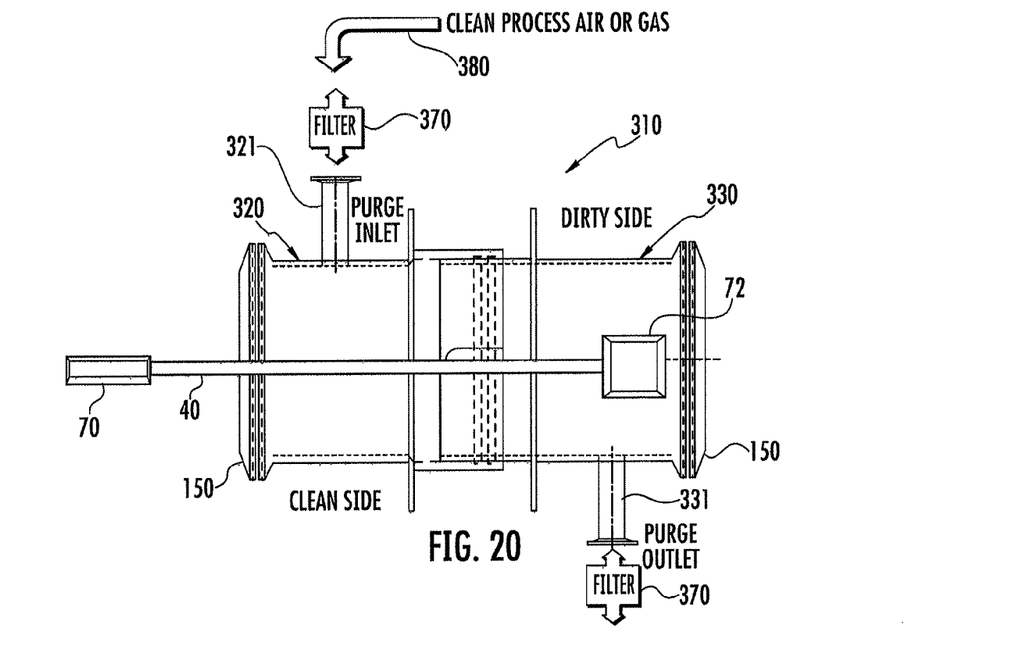

Referring now to FIG. 20, the sealed chamber in the pass-through system 310 is now pressurized with process air from a process air source 380. The Dirty Side end cap 150 and any associated gasket 244 I then removed. The process air flow ensures that any air flow is outward into the Dirty Side.

Figure 21:
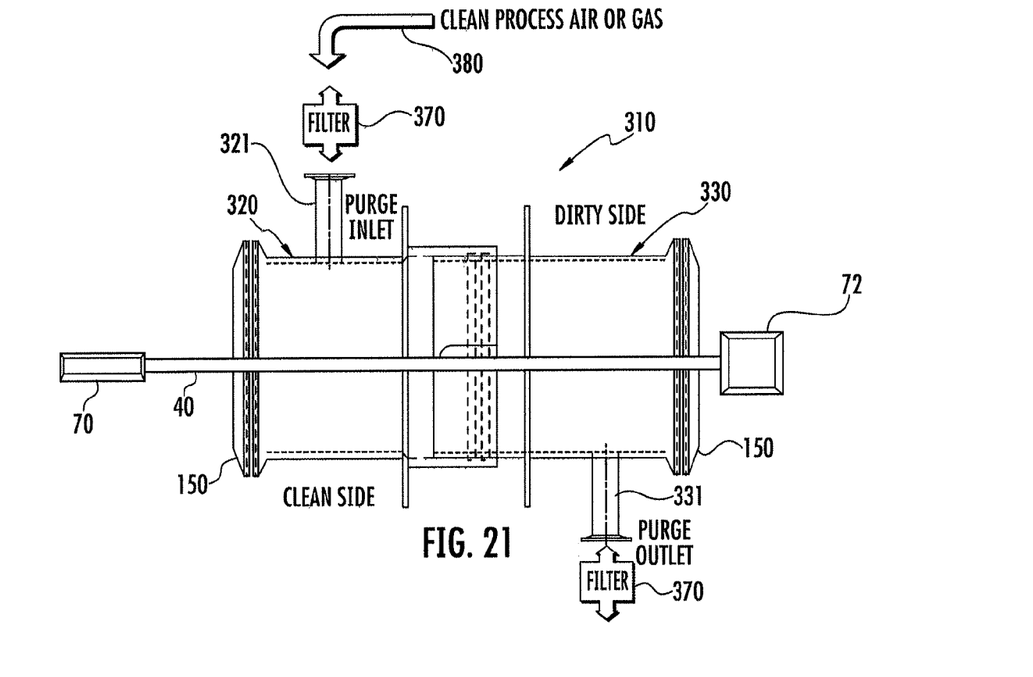

As shown in FIG. 21, the tube 40 is now pulled into the Dirty Side, where a seal or gasket 244, 144, 44 is attached to the tube 40 and a clamp plate 150 is then re-installed and clamped in position so that the Dirty Side is again closed, with the tube 40 and end cap 72 extending through the pass-through system 310.

Figure 22:
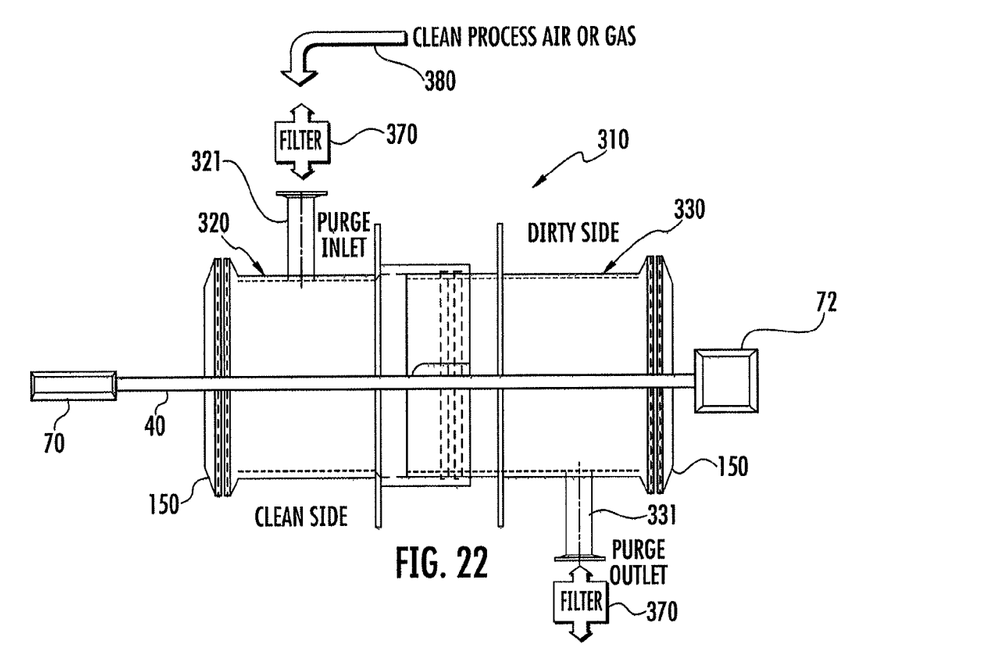

FIG. 22 shows the tube 40 extending through the pass-through system 310 now ready to use to transfer material through the tube 40 from the Clean Side to the Dirty Side or vice versa. Here, the process air source 380 can optionally be turned off.

Figure 23:
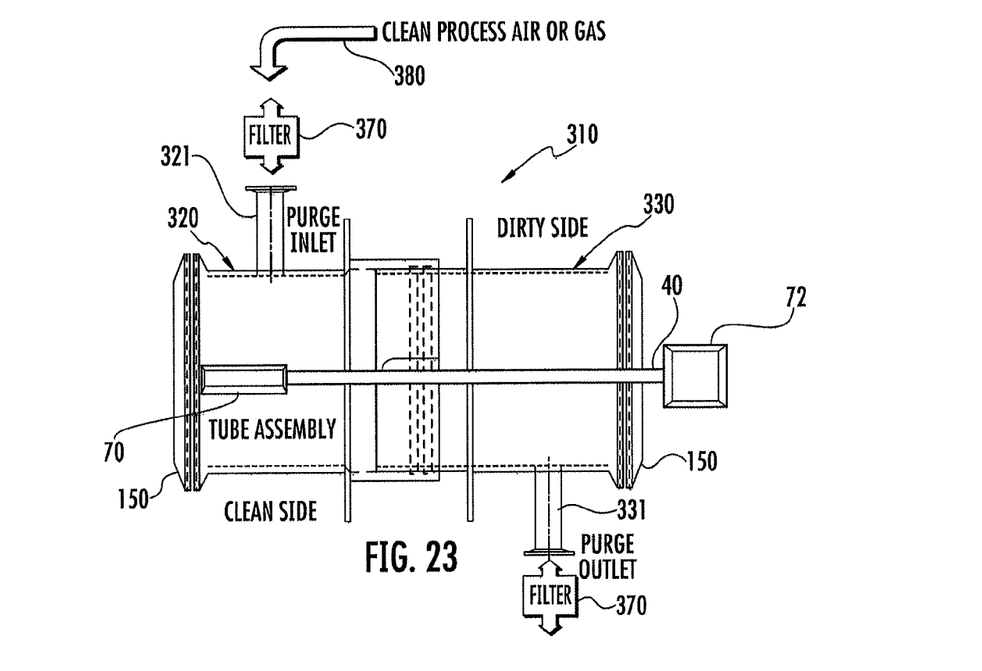

FIG. 23 shows the removal process for the tube 40 after the transfer is complete. Here, the end of the tube 40 on the Clean Side is capped or heat sealed. With the process air source 380 on, the clean Side clamp plate 150 and associated gasket are removed, and the tube 40 and attached gasket are placed in the chamber. A clamp plate 150, which can be solid, and an associated non-perforated gasket 244 are then re-installed to close off the Clean Side.

Figure 24:
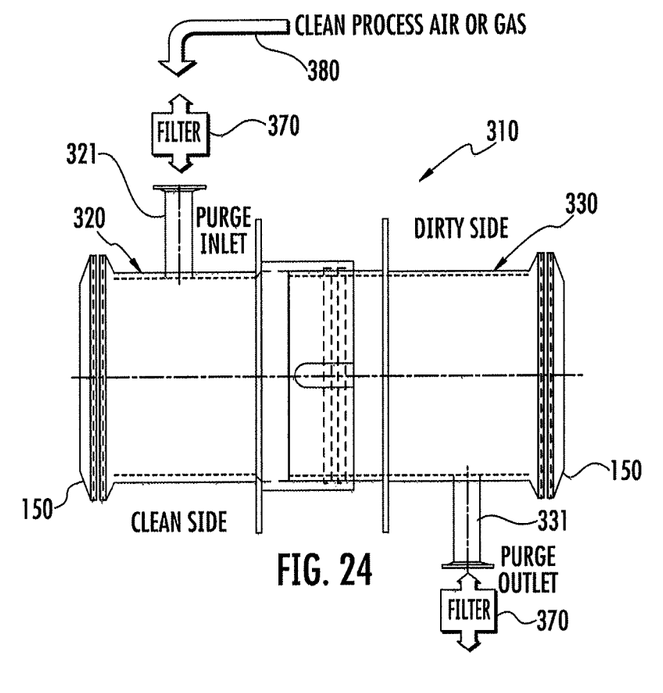

FIG. 24 shows the Dirty Side clamp plate 150 being removed, so that the used tube assembly 40 along with the associated gaskets attached to it are removed. A clamp plate 150, which can be solid, and an associated non-perforated gasket 244 are then re-installed to close off the Dirty Side.

Figure 25:
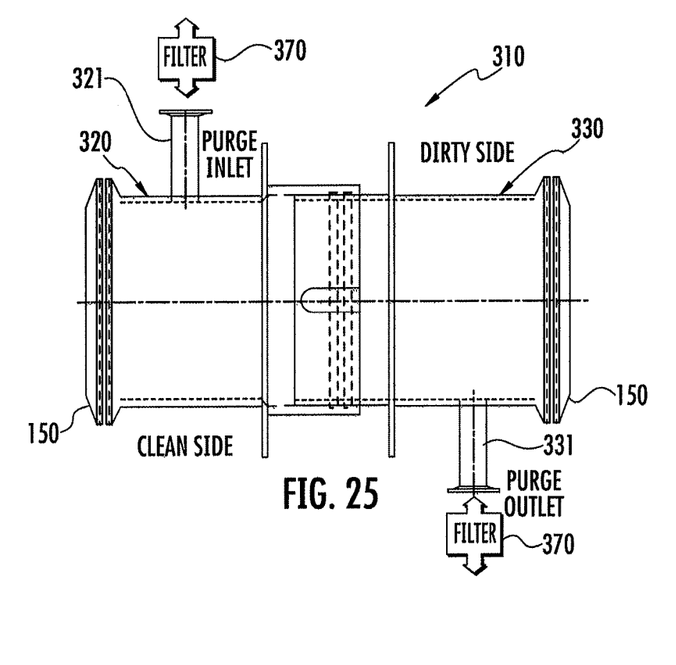

FIG. 25 shows the wall pass-through system 310 back at the initial state and the process air source 380 is turned off or disconnected.

Figures 26, 27:
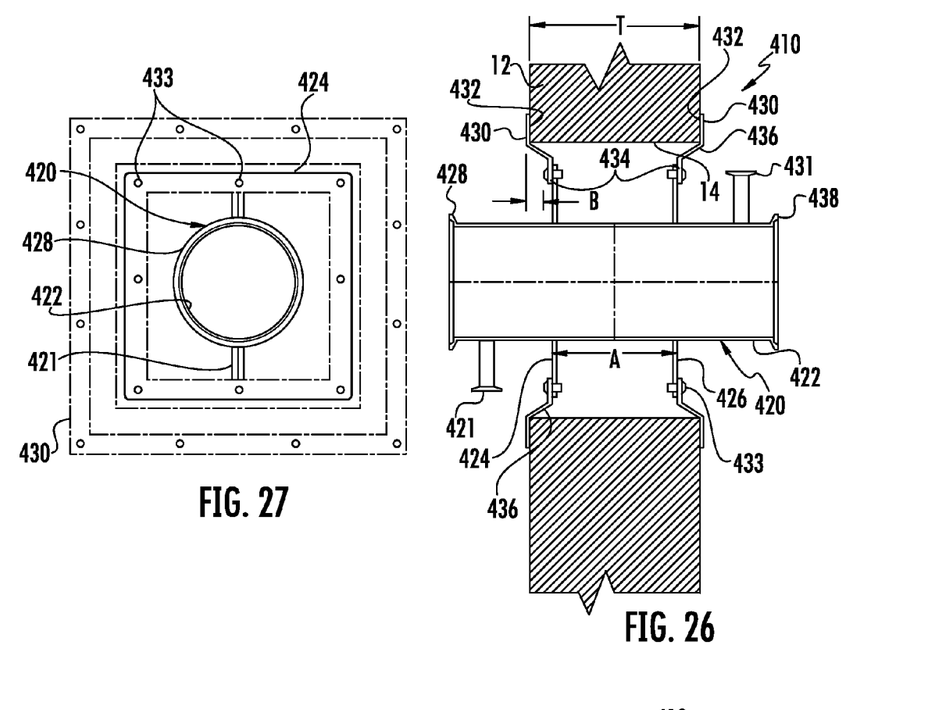
FIG. 26 is a cross-sectional view of a further alternate embodiment of a single use wall pass-through system according to the invention.
FIG. 27 is an end view of the tube assembly of the fixed wall part in the embodiment of FIG. 26.
Figure 28:
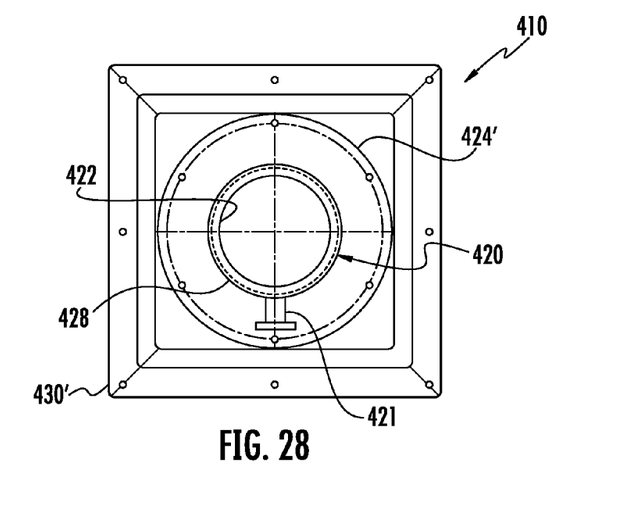
FIG. 28 is a detail view of the attachment flange used to mount the tube assembly of FIG. 27 to the wall.

Referring to FIGS. 26 and 27, another embodiment of a single use wall pass-through system 410 is provided. In this embodiment, a tube assembly 420 is attached through the opening 14 in the wall 12. The tube assembly 420 includes a tubular body 422 with at least one support flange 424, 426. Preferably, two of the support flanges 424, 426 are provided spaced axially apart from one another. A first mounting flange 430 is connected to the support flange 424 around an inner periphery of the first mounting flange 430 and adapted to be connected to the wall 12 around an outer periphery thereof that overlaps the opening 14. In this embodiment, the outer periphery of the support flanges 424, 426 is generally rectilinear, as shown in FIG. 27, and the mounting flange 430 has a corresponding opening. Fasteners 433 connect the support flange 424 to the mounting flange 430 in the overlap area. A sealant is preferably also applied to the faying surface during assembly. FIG. 28 shows an alternate arrangement where the outer periphery of the support flange 424' is generally circular, and the mounting flange 430' has a correspondingly shaped inner periphery with a generally circular opening.

Preferably, a second mounting flange 430 connects the second support flange 426 to an opposite side of the wall 12 from the first mounting flange 430. Preferably, the mounting flanges 430 include a wall mounting surface 432 and a support flange mounting surface 434, and the wall mounting surface 432 is axially offset by an angled offset surface 436 from the support flange mounting surface 434. Here, the axial offset B is determined by a wall thickness T and a distance A between the first and second support flanges 424, 426, and divided by two (B=(T−A)/2) so that the tube assembly 420 is centered in the wall opening 14. Different mounting flanges 430 having a range of axial offsets B can be provided to accommodate walls 12 of different thicknesses. During installation, a sealant is also placed between the wall mounting surface 432 and the wall 12.

Figure 31:
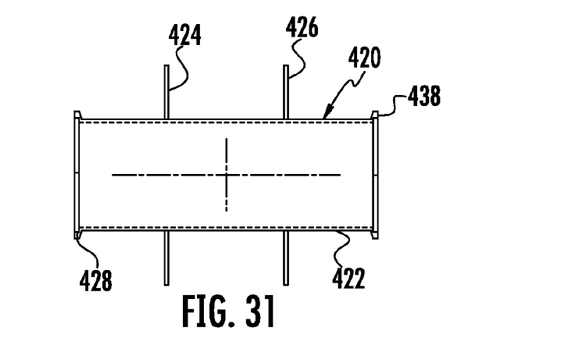
FIG. 31 is a detail view of the tube assembly of the fixed wall part shown in FIG. 27.

The tube assembly 420 includes a clamping flange 428, 438 connected to each end of the tubular body 422. Preferably, the tube assembly 420 is made from stainless steel components that are welded together. The tube assembly can be provided with purge tubes 421, 431, which are used in the same manner as the purge tubes 321, 331 discussed above. Alternatively, as shown in FIG. 31, the tube assembly 420 can be provided without purge tubes.

Figure 29:
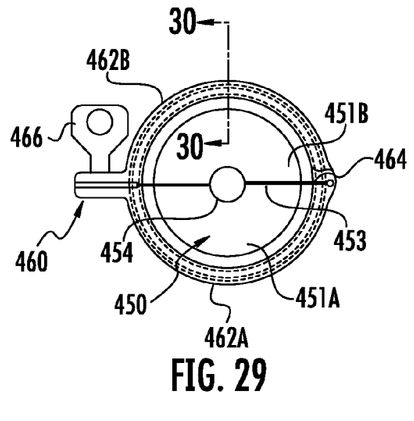
FIG. 29 is an elevational view of a split clamp plate and clamp assembly for use with the single use wall pass-through systems according to the invention.
Figure 32:
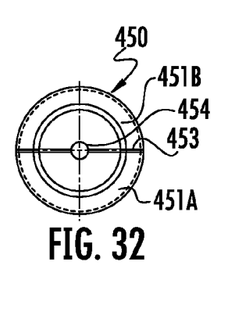
FIG. 32 is an elevational view of a split clamp plate with a single hose pass-thru opening for use with the single use wall pass-through systems according to the invention.
Figure 33:
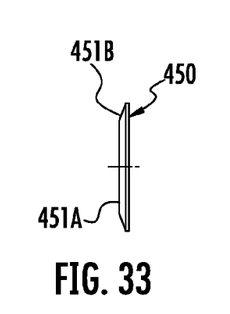
FIG. 33 is a side view of the split clamp plate shown in FIG. 32.

A hose or tube 40 can arranged through the tubular body 422 and passes through a hose opening 48 in a gasket 44, as discussed above in connection with the prior embodiments of the invention (for example, see FIGS. 1 and 12). A clamp ring clamps the gasket 44 between one of the clamping flanges 428, 438 and a clamp plate. While the clamp rings 60 and clamp plates 50, 150, etc., as discussed in connection with the previous embodiments can be used, in a preferred further development shown in FIGS. 29-34, the clamp plate 450 is used and is provided as two clamp plate pieces 451A, 451B that are aligned together about a dividing line 453 to form the clamp plate 450. A gasket groove 452 is preferably also provided. As shown in FIGS. 29 and 32, and a clamp plate hose opening 454 for the hose or tube intersects the dividing line 453. As discussed above, the tube or hose and the gasket are single use, but the clamp plates 450 can be re-used.

Figure 30:
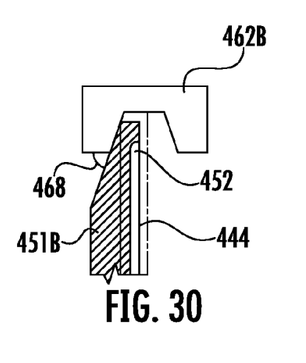
FIG. 30 is an enlarged cross-sectional view taken along line 30-30 in FIG. 29.
Figure 34:
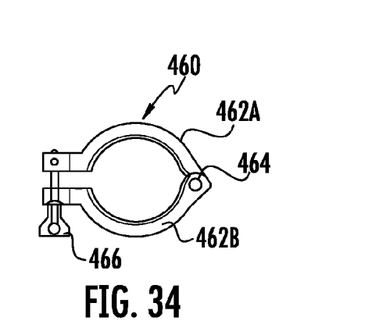
FIG. 34 is an elevational view of a clamp for use with the split clamp plate in FIG. 33.

As shown in FIGS. 29 and 34, in one particularly preferred arrangement, the clamp ring 460 includes two half-rings 462A, 462B that are connected to one another by a hinge 464 at one end, and can be pivoted together and clamped in a closed position by a clamp screw 466. However, in order to allow easier handling and installation, the clamp plate pieces 451A, 451B are fixed to respective ones of the half-rings 462A, 462B. This is preferably done with a welded connection 468, as shown in FIG. 30. This arrangement allows the clamp ring 460 and clamp plate 450 to be installed over a hose or tube that is positioned in or through the tube assembly 420 or any of the prior tube assemblies by a single installer.

Figure 35:
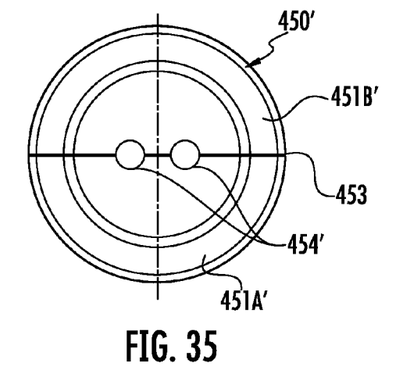
FIG. 35 is an elevational view of a split clamp plate with two hose pass-thru openings for use with the single use wall pass-through systems according to the invention.
Figure 36:
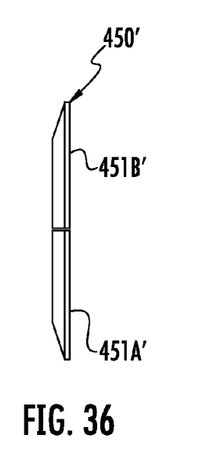
FIG. 36 is an elevational view of the split clamp plate of FIG. 35.
Figure 37:
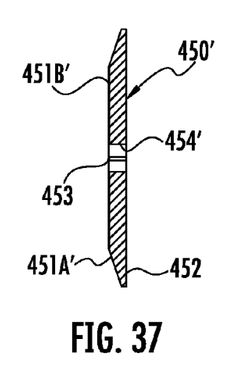
FIG. 37 is a cross-sectional view of a split clamp plate having a hose opening with a straight hose engaging surface.

Referring now to FIGS. 35-37, a clamp plate 450' having two clamp plate pieces 451A', 451B' is shown that includes a plurality of the clamp plate hose openings 454'. Each of the clamp plate hose openings 454' intersects the dividing line. This allows the two clamp plate pieces 451A', 451B' to be installed over multiple hoses. The clamp plate pieces 451A', 451B' can be fixed to respective ones of the half-rings 462A, 462B of a clamp ring 460 in a similar manner as discussed above.

Figure 38:
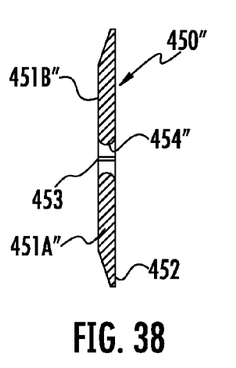
FIG. 38 is a cross-sectional view of a split clamp plate having a hose opening with a convex hose engaging surface.
Figure 39:
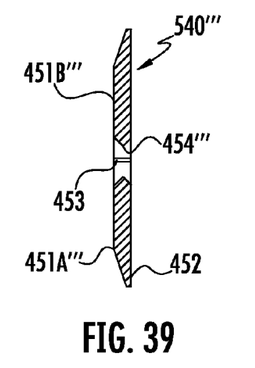
FIG. 39 is a cross-sectional view of a split clamp plate having a hose opening with a beveled hose engaging surface

In one arrangement, the clamp plate hose opening 454 is larger than an outside diameter of the hose or tube to be inserted therethrough. Alternatively, as shown in FIGS. 38 and 39, the clamp plate 450", 450'", preferably formed of two clamp plate pieces 451A", 451B"; 451A'", 451B'" can include a clamp plate hose opening 454", 454'" having a tube engaging profile on an inner surface thereof. Here, the hose or tube preferably fits in the clamp plate hose opening 450", 450" with an interference fit. The tube engaging profile can be a convex surface, as shown in FIG. 38. It can also be a beveled surface, as shown in FIG. 39, or other shape that provides a more concentrated contact force for engaging the hose or tube that extends through the opening 454", 454'".

As discussed above, the hose or tube is preferably made of silicone or a thermoplastic material the gasket is made from silicone or a thermoplastic material, and is connected to the hose using silicone or an adhesive of chemical bond In another aspect, a method of connecting a hose through a single-use wall pass-through system 410 is provided. The method is similar to the method discussed above in connection with the system 310, and includes removing a clamp plate 450 installed on a clean side of a wall pass-through chamber defined by tubular body 420 connected to clamping flanges 428, 438 that are attached on either side of a wall 12 through an opening 14 between the clean side and a dirty side, with the tubular body 420 being connected to the wall in a sealed manner;

installing the tube through a hole or opening in a gasket on the clean side, such that the tube is connected to the clean side gasket in a sealed manner gasket;

placing an end of the tube which is closed off into an inside of the wall pass-through chamber;

re-installing the clean side clamp plate 450 over the gasket on the tube on the clean side, preferably by closing together a clamp 460 with the half rings 462A, 462B to which the clamp pieces 451A, 451B are attached, so that the end of the tube is sealed in the chamber;

pressurizing the chamber with process air from a process air source;

removing a clamp plate 450 from the dirty side;

pulling the tube into the dirty side;

installing the tube through a hole or opening in a gasket on the dirty side such that the tube is connected to the dirty side gasket in a sealed manner gasket;

re-installing the dirty side clamp plate 450 over the gasket on the tube on the dirty side, preferably by closing together a clamp 460 with the half rings 462A, 462B to which the clamp pieces 451A, 451B are attached, so that the end of the tube extends out through the dirty side gasket.

To retain the tube on one or both sides, the clamp plate 454", 454''' with the clamp plate hose opening 454", 454''' having a tube engaging profile on an inner surface thereof can be used to clamp against the hose or tube.

The pass-through system 10, 110, 210, 310, 410 provides a sealed pass-through which can be used in connection with chemical, bio and pharma processing applications where material flow in to or out from a clean room or processing environment through single-use silicone or thermoplastic tubes 40. The system 10, 110, 210, 310, 410 ensures that any material that is exposed is contained within the room or area delimited via the wall 12 and/or prevents contaminants from entering into the area. When not in use, end caps (not shown) can be applied to the clamping flanges 28, 38; 128, 138; 228, 238; 328, 338; 428, 438 on the first and second fixed wall parts 20, 30; 120, 130; 220, 230; 320, 330 or the tube assembly 420 using clamps 60. Additionally, the invention provides for use of the arrangement 10, 110, 210, 310, 410 as a sealable pass-through box for allowing any materials to be passed into or out of the clean room through the pass-through assemblies.

While the present invention has been described in terms of the preferred embodiment shown, those skilled in the art will recognize that other variations and modifications can be made which fall within the scope of the present invention.

What is claimed is:

1. A single use wall pass-through system, comprising
a tube assembly that is attachable through an opening in a wall, including a tubular body with at least one support flange,
a first mounting flange connected to the support flange around an inner periphery of the first mounting flange and adapted to be connected to the wall around an outer periphery thereof that overlaps the opening,
the tube assembly includes a clamping flange connected to each end of the tubular body,
a hose or tube is arranged through the tubular body and passes through a hose opening in a gasket,
a clamp ring that clamps the gasket between one of the clamping flanges and a clamp plate,
the clamp plate is provided as two clamp plate pieces that are aligned together about a dividing line to form the clamp plate, and a clamp plate hose opening for the hose or tube intersects the dividing line, and
the tube or hose and the gasket are single use.

2. The system of claim 1, wherein the clamp ring includes two half-rings that are connectable to one another, and the clamp plate pieces are fixed to respective ones of the half-rings.

3. The system of claim 1, wherein there are first and second ones of the support flanges on the tubular body, and a second mounting flange connects the second support flange to an opposite side of the wall from the first mounting flange.

4. The system of claim 3, wherein the mounting flanges include a wall mounting surface and a support flange mounting surface, and the wall mounting surface is axially offset from the support flange mounting surface.

5. The system of claim 4, wherein the axial offset is determined by a wall thickness and a distance between the first and second support flanges.

6. The system of claim 4, wherein the wall mounting flange surfaces are sealed to the wall and the support flange mounting surfaces are sealed to the support flanges.

7. The system of claim 1, wherein there are a plurality of the clamp plate hose openings in the clamp plate, and each of the clamp plate hose openings intersects the dividing line.

8. The system of claim 1, wherein the clamp plate hose opening is larger than an outside diameter of the hose or tube.

9. The system of claim 1, wherein the clamp plate hose opening includes a tube engaging profile on an inner surface thereof.

10. The system of claim 9, wherein the hose or tube fits in the clamp plate hose opening with an interference fit.

11. The system of claim 10, wherein the tube engaging profile is a convex surface.

12. The system of claim 10, wherein the tube engaging profile is a beveled surface.

13. The system of claim 1, wherein the hose or tube is made of silicone or a thermoplastic material the gasket is made from silicone or a thermoplastic material, and is connected to the hose using silicone or an adhesive of chemical bond.

14. The system of claim 1, wherein a plurality of the hose openings are located in the gasket, and a corresponding plurality of the hoses or tubes are provided, with one of the hoses or tubes extending through each of the openings.

15. A method of connecting a hose through a single-use wall pass-through system, comprising:

removing a clamp plate installed on a clean side of a wall pass-through chamber defined by a tubular body connected to clamping flanges that are attached on either side of a wall through an opening between the clean side and a dirty side, with the body being connected to the wall in a sealed manner;

installing the tube through a hole or opening in a gasket on the clean side, such that the tube is connected to the clean side gasket in a sealed manner;

placing an end of the tube which is closed off into an inside of the wall pass-through chamber;

re-installing the clean side clamp plate over the gasket on the tube on the clean side so that the end of the tube is sealed in the chamber;

pressurizing the chamber with process air from a process air source;

removing a clamp plate from the dirty side;

pulling the tube into the dirty side;

installing the tube through a hole or opening in a gasket on the dirty side such that the tube is connected to the dirty side gasket in a sealed manner gasket;

re-installing the dirty side clamp plate over the gasket on the tube on the dirty side so that the end of the tube extends out through the dirty side gasket.

16. The method of claim 15, wherein the clean side clamp plate is provided as two clamp plate pieces that are aligned together about a dividing line to form the clamp plate, and a clamp plate hose opening for the hose or tube intersects the dividing line, and the two clamp plate pieces are placed around the hose or tube during the re-installing of the clean side clamp plate.

17. The method of claim 16, wherein clamp plate hose opening includes a tube engaging profile on an inner surface thereof that clamps against the hose or tube.

18. The method of claim 15, wherein the dirty side clamp plate is provided as two clamp plate pieces that are aligned together about a dividing line to form the clamp plate, and a clamp plate hose opening for the hose or tube intersects the dividing line, and the two clamp plate pieces are placed around the hose or tube during the re-installing of the dirty side clamp plate.

* * * * *